United States Patent
Sarkar et al.

(10) Patent No.: US 12,158,837 B2
(45) Date of Patent: Dec. 3, 2024

(54) SYSTEM AND METHOD FOR GENERATING AUTOMATION TEST SCRIPTS DYNAMICALLY FOR HUMAN MACHINE INTERFACE TESTING

(71) Applicant: Wipro Limited, Bangalore (IN)

(72) Inventors: Arnik Sarkar, Murshidabad (IN); Sayanshree Ghosh, Kolkata (IN)

(73) Assignee: Wipro Limited, Bangalore (IN)

( * ) Notice: Subject to any disclaimer, the term of this patent is extended or adjusted under 35 U.S.C. 154(b) by 233 days.

(21) Appl. No.: 17/457,927

(22) Filed: Dec. 7, 2021

(65) Prior Publication Data

US 2023/0060213 A1    Mar. 2, 2023

(30) Foreign Application Priority Data

Aug. 30, 2021    (IN) .............................. 202141039143

(51) Int. Cl.
*G06F 11/36*    (2006.01)

(52) U.S. Cl.
CPC ...... *G06F 11/3684* (2013.01); *G06F 11/3688* (2013.01); *G06F 11/3692* (2013.01); *G06F 11/3696* (2013.01)

(58) Field of Classification Search
CPC ........................................... G06F 11/36–3696
See application file for complete search history.

(56) References Cited

U.S. PATENT DOCUMENTS

| | | | |
|---|---|---|---|
| 8,214,805 B2 | 7/2012 | Stewart | |
| 8,548,231 B2 | 10/2013 | Shet et al. | |
| 8,701,090 B2 | 4/2014 | Zavatone | |
| 8,826,084 B1 | 9/2014 | Gauf et al. | |
| 8,984,339 B2* | 3/2015 | Ahmed | G06F 11/263 717/125 |
| 9,098,635 B2 | 8/2015 | Peri-Glass et al. | |
| 9,141,518 B2 | 9/2015 | Bharadwaj et al. | |
| 9,600,401 B1 | 3/2017 | Haischt et al. | |
| 10,216,377 B2* | 2/2019 | Ozcan | G06F 40/197 |
| 11,341,033 B2* | 5/2022 | Mohankumar | G06F 18/24323 |
| 2013/0198567 A1* | 8/2013 | Ahmed | G06F 11/3684 714/E11.177 |
| 2017/0277374 A1* | 9/2017 | Ozcan | G06V 30/414 |
| 2019/0370162 A1 | 12/2019 | Mandal et al. | |
| 2021/0326247 A1* | 10/2021 | Mohankumar | G06F 18/24323 |
| 2022/0374334 A1* | 11/2022 | Brown | G06F 11/3688 |

* cited by examiner

*Primary Examiner* — Todd Aguilera
(74) *Attorney, Agent, or Firm* — Finnegan, Henderson, Farabow, Garrett & Dunner, LLP

(57) ABSTRACT

Disclosed herein is a system and a method for generating automation test scripts dynamically for Human Machine Interface (HMI) testing. Test configurations are generated for a Device Under Test (DUT) (115) based on a screen transition dataset upon receiving a user request (105). Based on test configurations and the screen transition dataset, HMI components located in a test path are identified for transitions from source HMI screens to destination HMI screens. Based on the HMI components, reference images are determined for the destination HMI screens from a screen design dataset. The test configurations are executed on the DUT (115) via an external simulating device (113) and transition associated with the test path is validated based on matching the real time destination HMI screen image with the reference image. Based on a validation result, automation test report (117) is generated for the DUT (115).

11 Claims, 8 Drawing Sheets

|   | A | B |
|---|---|---|
| 1 | APP | TEST CONFIGURATION STATUS |
| 2 | AM | YES |
| 3 | ANDROID AUTO | NA |
| 4 | APP INSTALLER | NA |
| 5 | AUX | NA |
| 6 | BT | NA |
| 7 | CARPLAY | NA |
| 8 | CLOCK | NA |
| 9 | COMPASS | NA |
| 10 | DAB | NO |
| 11 | ENERGY FLOW | NA |
| 12 | EMAIL | NO |
| 13 | FM | NO |
| 14 | HDMI | NA |
| 15 | CONNECT | NA |
| 16 | LW | NA |
| 17 | MESSAGES | NO |
| 18 | MVC | NO |
| 19 | NAVIGATION | NA |
| 20 | MW | NA |
| 21 | NFC | NA |
| 22 | PHONE | NO |
| 23 | SETTINGS | NO |
| 24 | SMARTPHONE | NA |

| > | APPS | GENERAL | AM | ANDROID AUTO |

FIG. 2B

| PARTID | WIDGET TYPE | PARENT PARTID | PARENT WIDGET TYPE | PICTURE BOX | X | Y | WIDTH | HEIGHT | LINE SPACING | TEXT | FONT SIZE | FONT COLOR |
|---|---|---|---|---|---|---|---|---|---|---|---|---|
| 1C00177 | CONTAINER | NA | NA | BG_IMAGE.PNG | 0 | 0 | 1280 | 720 | 0 | NA | NA | NA |
| 3C00177 | PICTUREBOX | 1C00177 | CONTAINER | MENU_CONTAINER.PNG | 0 | 70 | 350 | 158 | 0 | | | |
| 7C00177 | PICTUREBOX | 3C00177 | PICTUREBOX | SONG_ICON.PNG | 40 | 128 | 40 | 40 | 0 | | | |
| 8C00177 | TEXT | 3C00177 | PICTUREBOX | NA | 65 | 122 | 200 | 30 | 0 | SONGS | 35 | #FFFF |

FIG. 2E

SYSTEM AND METHOD FOR GENERATING AUTOMATION TEST SCRIPTS DYNAMICALLY FOR HUMAN MACHINE INTERFACE TESTING

TECHNICAL FIELD

The present subject matter is generally related to human machine interface (HMI) testing and more particularly, but not exclusively, to a system and a method for generating automation test scripts dynamically for HMI testing.

BACKGROUND

In present days, digitization of products and faster time-to-market have become extremely critical for success of a product. With introduction of various platforms stack to embedded industry, Human Machine Interface (HMI) has become one and only differentiator for various Original Equipment Manufacturer's (OEM) product. Further, maintaining quality and faster time-to-market for the HMI have also become significant for the OEM's business at present. Particularly, maintaining the quality and time to market for the HMI highly depend on effectiveness of testing HMI products. Most of the OEMs today rely on automation of HMI testing for reducing manual errors as well as reducing over-all testing cycle time.

Conventionally, performing the HMI testing includes manually capturing HMI screenshots from a target device, and verifying the HMI screens for automation cycles by utilizing the captured HMI screenshots as reference images. The aforesaid approach is not reliable, as the HMI screens are not verified against requirement screen image. Instead, the HMI screens are verified through developed screen image. As a result, errors present in HMI screen design such as, mismatch in width, height, font-size, and the like, are not properly detected. Additionally, in the conventional approaches of the HMI testing, separate test-scripts need to be written for validating each HMI screen transition. In scenarios where number of HMI screen transitions is large, manually writing the test-script for each transition becomes tedious and time-consuming task. As an example, automotive infotainment system comprises more than thousands of HMI screen transitions and hence creating corresponding test-scripts requires huge efforts for the HMI testing. Further, the aforesaid challenges worsen with frequent modification in the HMI requirements. Firstly, because the test-scripts need to be rewritten for the modified HMI requirements, which involves additional effort. Further, manual errors are inadvertently introduced in the test-scripts developed by testing personnel. Secondly, the screenshots need to be recaptured manually from the target for the modified and/or newly added HMI screens to utilize as the reference images. Both the activities introduce significant delay in time to market.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure discloses an auto script generation system for generating automation test scripts dynamically for Human Machine Interface (HMI) testing. The auto script generation system comprises a processor, and a memory communicatively coupled to the processor. When a user request is received at the auto script generation system, the processor generates a plurality of test configurations for a Device Under Test (DUT). The plurality of test configurations is generated based on a screen transition dataset obtained from a Transition Logic Database (TLDB). The screen transition dataset comprises a plurality of conditions associated with HMI screen transitions. Based on at least one test configuration selected from the plurality of test configurations and the screen transition dataset, the processor identifies one or more HMI components located in a test path for each transition from a source HMI screen to a destination HMI screen. Based on the identified one or more HMI components in the test path, the processor determines a reference image for each destination HMI screen from a screen design dataset obtained from a View Database (VDB). Further, the processor executes the at least one test configuration on the DUT via an external simulating device and validating each transition associated with the test path based on matching a real time destination HMI screen image with the reference image. Based on a validation result, the processor generates an automation test report for the DUT.

Further, in an embodiment, the present disclosure may relate to a method of generating automation test scripts dynamically for HMI testing. The method comprises generating a plurality of test configurations for a DUT upon receiving a user request. The plurality of test configurations is generated based on a screen transition dataset obtained from a TLDB. The screen transition dataset comprises a plurality of conditions associated with HMI screen transitions. Upon generating the plurality of test configurations, the method comprises identifying one or more HMI components located in a test path for each transition from a source HMI screen to a destination HMI screen based on at least one test configuration selected from the plurality of test configurations and the screen transition dataset. Further, the method comprises determining a reference image for each destination HMI screen from a screen design dataset obtained from a View Database (VDB) based on the identified one or more HMI components in the test path and executing, the at least one test configuration on the DUT via an external simulating device and validating each transition associated with the test path based on matching a real time destination HMI screen image with the reference image. Thereafter, the method comprises generating an automation test report for the DUT based on a validation result.

In an embodiment, the present disclosure relates to a non-transitory computer readable medium including instructions stored thereon that when processed by at least one processor may cause ab auto script generation system to generate a plurality of test configurations for a Device Under Test (DUT). The plurality of test configurations is generated based on a screen transition dataset obtained from a Transition Logic Database (TLDB). The screen transition dataset comprises a plurality of conditions associated with HMI screen transitions. Based on at least one test configuration selected from the plurality of test configurations and the screen transition dataset, the instruction causes the processor to identify one or more HMI components located in a test path for each transition from a source HMI screen to a destination HMI screen. Based on the identified one or more HMI components in the test path, the instruction causes the processor to determine a reference image for each destination HMI screen from a screen design dataset obtained from a View Database (VDB). Further, the instruction causes the processor to execute the at least one test configuration on the DUT via an external simulating device and validate each transition associated with the test path based on matching a real time destination HMI screen image with the reference image. Based on a validation result, the instruction causes the processor to generate an automation test report for the DUT.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which:

FIG. 2B shows an exemplary table stored in a test configuration database of an auto script generation system in accordance with some embodiments of the present disclosure;

FIGS. 2C, 2D and 2E show exemplary embodiments of HMI components associated with a destination HMI screen in accordance with some embodiments of the present disclosure;

Figure 1:
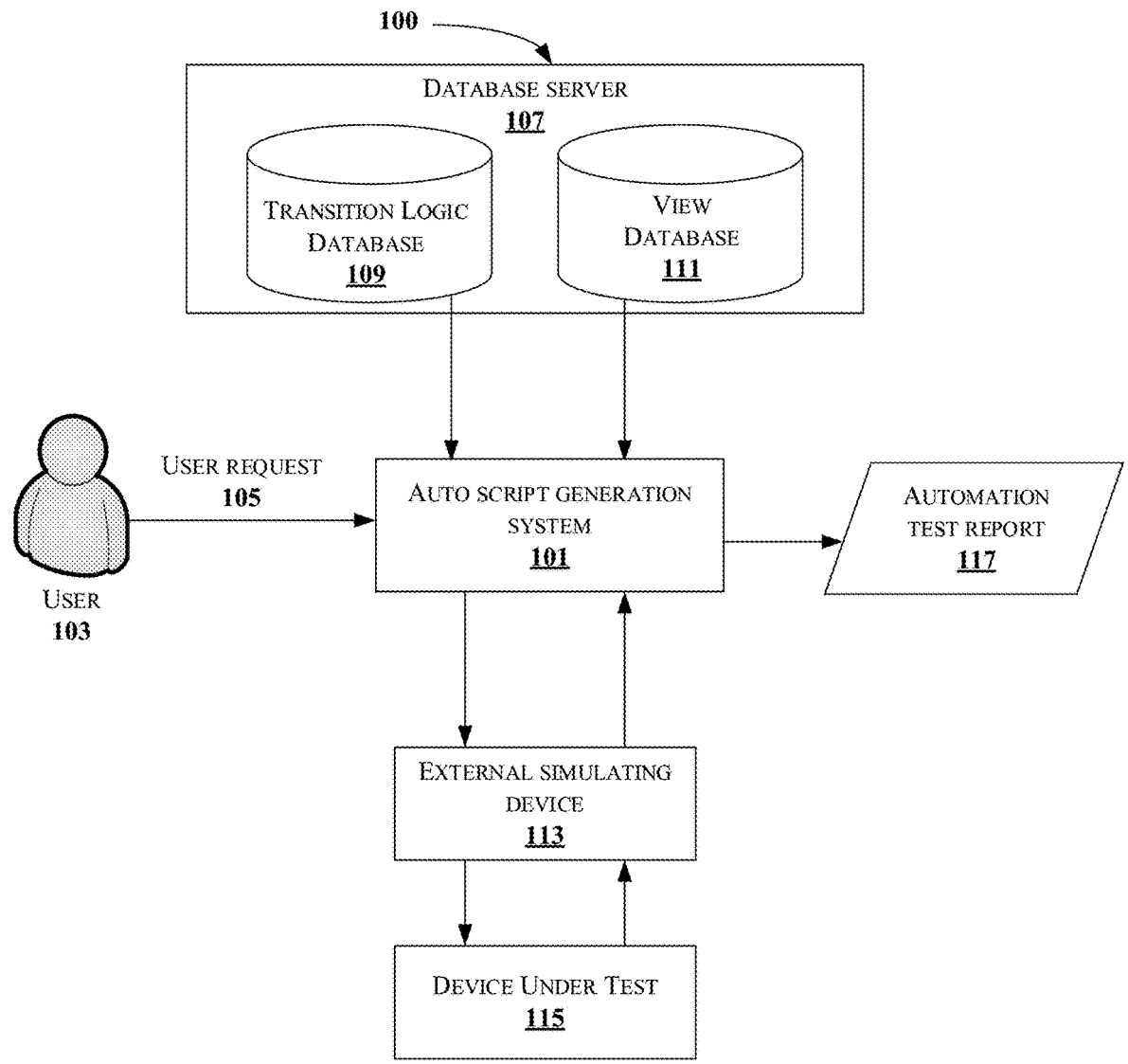
FIG. 1 shows an exemplary environment for generating automation test scripts dynamically for HMI testing in accordance with some embodiments of the present disclosure.

It should be appreciated by those skilled in the art that any flow diagrams and timing diagrams herein represent conceptual views of illustrative device embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the scope of the disclosure.

The terms "comprises," "comprising," "includes," "including" or any other variations thereof, are intended to cover a non-exclusive inclusion, such that a setup, device, or method that comprises a list of components or steps does not include only those components or steps but may include other components or steps not expressly listed or inherent to such setup, device, or method. In other words, one or more elements in a system or apparatus proceeded by "comprises . . . a" does not, without more constraints, preclude the existence of other elements or additional elements in the system or method.

Embodiments of the present disclosure may relate to an auto script generation system and a method for generating automation test scripts dynamically for Human Machine Interface (HMI) testing on a Device Under Test (DUT). The DUT may refer to a target hardware device on which one or more HMI applications are tested. As an example, the DUT may include, a smart phone, a Personal Computer (PC), a tablet, a notebook, a smart Television (TV), a smart refrigerator, a surveillance device, a medical imaging device, an In-Vehicle Infotainment (IVI) system and the like.

The present disclosure dynamically generates test-scripts from HMI requirements without any manual intervention, which validates both HMI screen transition control and HMI screen design with respect to the HMI requirements. Particularly, the present disclosure utilizes screen design specifications and screen transition specifications to determine reference images for destination HMI screens, so that real time HMI screens simulated on the DUT is validated with respect to HMI requirements during HMI testing on the DUT. Therefore, during the HMI testing procedure, the present disclosure facilitates accurate identification of errors related to the HMI screen transition along with the HMI screen design. This leads to testing the HMI application on the DUT with minimal manual intervention. Further, due to automation process, probability of introducing errors in the test configurations is significantly decreased. Consequently, time requirement to market the HMI product is significantly reduced even with dynamically changing HMI requirements. Also, the present disclosure enables effectively performing HMI testing on the DUTs, which improves quality of HMI products.

FIG. 1 shows an exemplary environment for generating automation test scripts dynamically for HMI testing in accordance with some embodiments of the present disclosure.

As shown in FIG. 1, the environment 100 may include an auto script generation system 101 connected to a Device Under Test (DUT) 115 through an external simulating device 113 for performing HMI testing on the DUT 115. The auto script generation system 101 may be connected to the external simulating device 113 through a wired communication interface or a wireless communication interface for executing test configurations and generating real time destination HMI screen images on the DUT 115 during the HMI testing. In the present disclosure, the DUT 115 may be a target hardware device on which one or more HMI applications are to be tested. For instance, the DUT 115 may include, a smart phone, a Personal Computer (PC), a tablet, a notebook, a smart Television (TV), a smart refrigerator, a surveillance device, a medical imaging device, an In-Vehicle Infotainment (IVI) system and the like. A person skilled in the art would understand that any other electronic devices in an environment 100, not mentioned herein explicitly, may also be referred as the DUT 115. The auto script generation system 101 may be implemented on any computing device such as a server, a High-Performance Computer (HPC), an electronic device, and the like.

In an embodiment, the auto script generation system 101 may be communicatively coupled to a database server 107, through a client-server communication interface for obtaining HMI requirements to generate reference images for HMI testing on the DUT 115. In the present disclosure, the database server 107 may comprise a Transition Logic Database (TLDB) 109 and a View Database (VDB) 111. The TLDB 109 may comprise screen transition datasets, and the VDB 111 may comprise screen design datasets. The TLDB 109 and the VDB 111 may be generated from an HMI screen transition specification and an HMI screen design specification, respectively. The HMI screen design specification may include details of HMI components defining the HMI screen appearance. The HMI screen transition specification may include screen flows, defined as per customer requirements. The HMI screen transition specifications may be available in an image file format, a text file format, a spreadsheet file format, a document file format, and the like. In an embodiment, if the HMI screen transition specification is in non-standardized format, then the HMI screen transition specification may be adapted to a standardized spreadsheet file format. The standardized spreadsheet file of the HMI screen transition specification may comprise a mapping between screens and HMI state, and each row of the adapted spreadsheet file may contain a state—transition details resulting the spreadsheet file to have a complete HMI state-chart. Likewise, the HMI screen design specification may be available in file formats associated with image editing tools, a spreadsheet file format, a document file format, and the like. In an embodiment, if the HMI screen design specification is in a non-standardized format, then the HMI screen design specification may be adapted to standardize a spreadsheet file format.

The auto script generation system 101 may be connected to the external simulating device 113 through a wired communication interface or a wireless communication interface for executing test configurations and generating real time destination HMI screen images on the DUT 115 during the HMI testing. In the present disclosure, the external simulating device 113 may be a simulation tool which may directly interact with the DUT 115 for executing the plurality of test configurations generated by the auto script generation system 101. The external simulating device 113 may comprise permission to interact with the DUT 115 and may be able to simulate test inputs. The external simulating device 113 may include support for capturing the real-time screen image of the DUT 115. Alternatively, the external simulating device 113 may be connected to the auto script generation system 101 through an automation adapter (not shown in figure). The automation adapter may be a wrapper module for the auto script generation system 101 and may work as adapter to specific external simulating devices. In an embodiment, specific functionalities associated with the external simulating device 113 and APIs may be abstracted to the auto script generation system 101 for easily integrating the external simulating device 113 with the auto script generation system 101.

As illustrated in FIG. 1, during the HMI testing, the auto script generation system 101 may receive a user request 105 from a user 103 for initiating HMI testing on a DUT 115. Here, the user request 105 may include details regarding access path information of the TLDB 109 and information associated with an HMI application to be tested on the DUT 115. As an example, the auto script generation system 101 may receive the user request 105 for HMI testing of call dialling application on a smart phone, which might be for a particular model, version or regions associated with it.

Upon receiving the user request 105, the auto script generation system 101 may generate a plurality of test configurations for the DUT 115. Particularly, the auto script generation system 101 may obtain a screen transition dataset from the TLDB 109 utilizing the access path information, and the information associated with the HMI application received in the user request 105. The screen transition dataset may comprise a plurality of conditions associated with HMI screen transitions. As an example, the screen transition dataset for HMI testing of call dialling application may comprise conditions for a transition from a home screen to a contact list screen, a transition from the contact list screen to contact details screen, a transition from the contact details screen to a call dialling screen, a transition from the contact details screen to a messaging screen, a transition from the call dialling screen to the home screen and the like.

In order to generate the plurality of test configurations, the auto script generation system 101 may identify one or more conditions from a plurality of conditions associated with HMI screen transitions based on the user request 105. Further, the auto script generation system 101 may apply each of the identified one or more conditions to a source HMI screen for determining the respective destination HMI screen. As an example, a destination HMI screen may show one or more icons for available media sources such as, Amplitude Modulation (AM) radio, Frequency Modulation (FM) radio, Universal Serial Bus (USB) connection, and Bluetooth connection. However, the icon associated with the USB connection may be displayed on the destination HMI screen, only when a USB cable is connected to the DUT. Further, the icon associated with Bluetooth music may be displayed on the destination HMI screen, only when a Bluetooth device is paired with the DUT. Verifying the connection of USB cable and pairing of the Bluetooth device with the DUT may be included in the plurality of conditions associated with HMI screen transitions.

Based on the destination HMI screen, the auto script generation system 101 may generate a test configuration for each of the one or more conditions. Thereafter, the auto script generation system 101 may generate the plurality of test configurations by combining the generated test configuration for each of the one or more conditions. As an example, the source HMI screen may be the home screen of the call dialling application, and the destination HMI screens may be the contact list screen, the contact details screen, the call dialling screen, and the like.

Once the plurality of test configurations is generated, the auto script generation system 101 may identify one or more HMI components located in a test path for each transition from the source HMI screen to the destination HMI screen. The auto script generation system 101 may identify one or more HMI components based on at least one test configuration selected from the plurality of test configurations and the screen transition dataset. Particularly, the auto script generation system 101 may identify the test path by analyzing the plurality of test configurations. Thereafter, the auto script generation system 101 may identify the one or more HMI components located in the test path for each transition from the source HMI screen to the destination HMI screen. Based on the identified one or more HMI components, the auto script generation system 101 may generate an HMI component tree. The HMI component tree may comprise a plurality of HMI components associated with source HMI screens and destination HMI screens arranged based on the hierarchical relationships among the plurality of HMI components.

Upon identifying the one or more HMI components located in the test path, the auto script generation system 101 may determine a reference image for each destination HMI screen from the screen design dataset. The screen design dataset may comprise view details of HMI screen images, widget properties information, widget type information, widget trigger information and widget status information. The widget type information may include the type of the widget such as, text box, picture box, button, combo box and the like. The widgets properties information may include widget Id, x-y coordinate, height, width, font type, font size, asset ID and the like. Also, the widgets properties information may include a "Parent Widget Id" which may help to create hierarchical relationship within the widgets. The widget trigger information may include trigger type and Trigger Id which may include details of the trigger associated with a widget. As an example, if a button supports click, the widget type may be "clicked," and the widget id may be "button_name_clicked." Further, a widget may support more than one trigger such as, click and long click. In such cases, the widget may have multiple trigger id and type combination. The widget status information may be one of static or dynamic.

In an embodiment, the auto script generation system 101 may determine the reference image based on the identified one or more HMI components in the test path. Particularly, the auto script generation system 101 may obtain the one or more HMI components associated with the destination HMI screen from a VDB 111 based on the HMI component tree. One or more hierarchical relationships are identified between the obtained one or more HMI components associated with the destination HMI screen by determining information of a parent widget for each of the one or more HMI components. Further, the auto script generation system 101 may determine resources assigned to each of the one or more HMI components associated with the destination HMI screen. The auto script generation system 101 may determine the reference image for the destination HMI screen by merging the determined resources with the respective obtained one or more HMI components based on the one or more hierarchical relationships.

Upon determining the reference image for each destination HMI screen, the auto script generation system 101 may execute the at least one test configuration on the DUT 115 via the external simulating device 113 and may validate each transition associated with the test path based on matching a real time destination HMI screen image with the reference image. Particularly, the auto script generation system 101 may generate the real time source HMI screen on the DUT 115 via the external simulating device 113. Further, the auto script generation system 101 may simulate a test input for each HMI component of the real time source HMI screen for triggering a screen transition to corresponding real time destination HMI screen on the DUT 115 via the external simulating device 113. As an example, the test inputs may include user interactions including but not limited to, click, long press, slide, flick, and the like. Based on the simulated test input, the auto script generation system 101 may capture and generate a real time destination HMI screen image for each screen transition on the DUT 115 via the external simulating device 113. The real time destination HMI screen image for each screen transition on the DUT 115 may be transmitted to the auto script generation system 101. Thereafter, the auto script generation system 101 may validate the real time destination HMI screen image based on matching of one or more HMI components corresponding to each of the real time destination HMI screen image with the one or more HMI components of respective reference image. Thus, the real time destination HMI screen image may be matched with the reference image in order to validate success or failure of the transition associated with the test path.

On executing the test configurations on the DUT 115, the auto script generation system 101 may generate an automation test report 117 for the DUT 115. Particularly, the auto script generation system 101 may generate the automation test report 117 based on a validation result. The auto script generation system 101 may determine that the validation result corresponds to transition success when all the HMI components of the real time destination HMI screen image match with all the HMI components of respective reference image. Alternatively, the auto script generation system 101 may determine that the validation result corresponds to transition failure when at least one HMI component of the real time destination HMI screen image does not match with the HMI component of respective reference image. Thereafter, the automation test report 117 may be provided to the user 103 for further analysis.

Figure 2A:
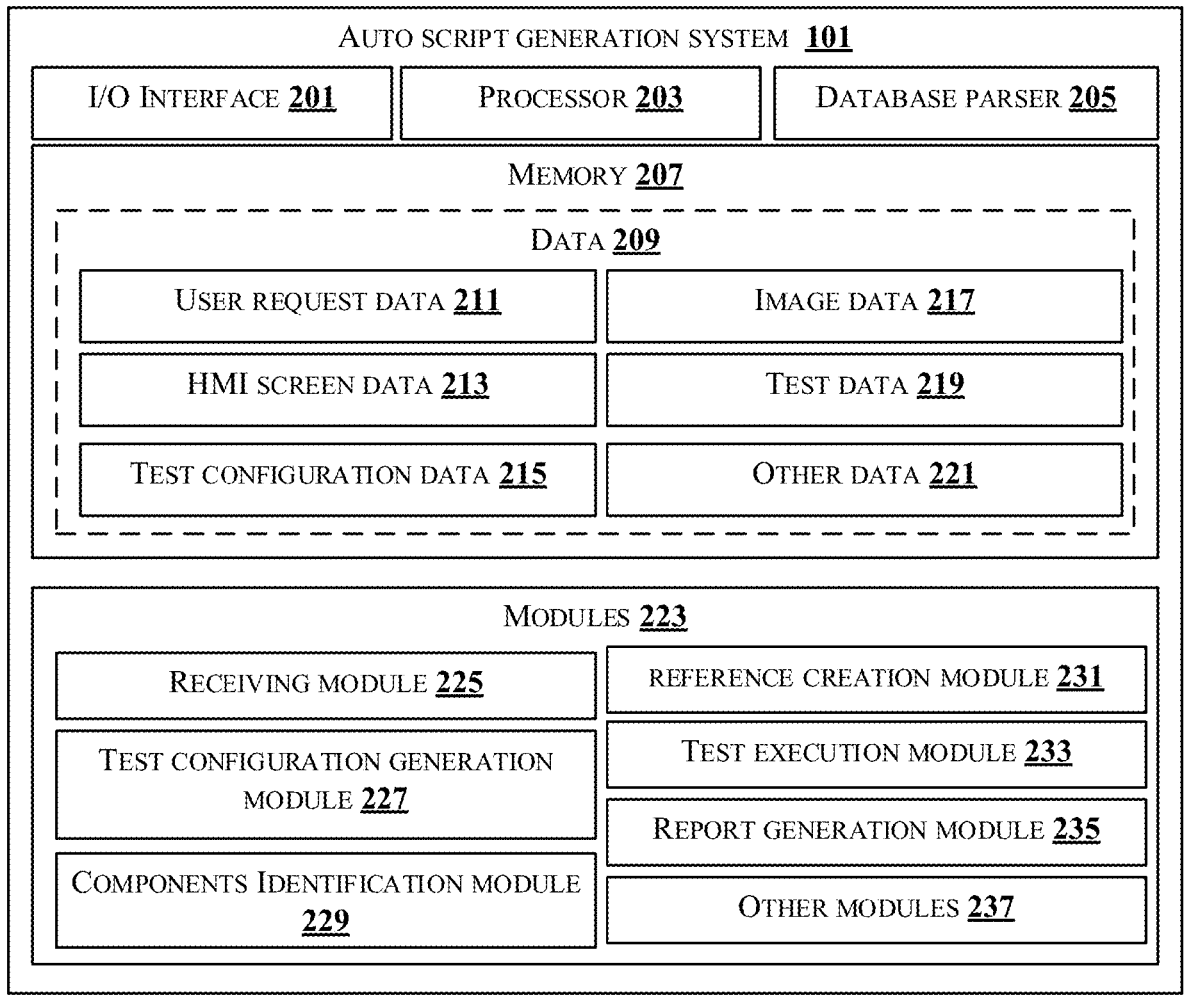
FIG. 2A shows a detailed block diagram of an auto script generation system in accordance with some embodiments of the present disclosure.

FIG. 2A shows a detailed block diagram of an auto script generation system in accordance with some embodiments of the present disclosure.

In some implementations, the auto script generation system 101 may include an I/O interface 201, a processor 203, a memory 207, a database parser 205 and modules 223. The memory includes data 209. The I/O interface 201 may be configured to receive the user request 105 from the user 103 for initiating the HMI testing, send a plurality of test configurations to the external simulating device 113, receive the real time destination HMI screen image from the external simulating device 113, and provide the automation test report 117 to the user 103.

The processor 203 may be configured to receive the user request 105, the screen transition dataset and the screen design dataset through the I/O interface 201. Further, the processor 203 may retrieve data from the memory 207 and interact with the modules 223 and the database parser 205 to process the user request 105 and generates automation test scripts dynamically for HMI testing. In the auto script generation system 101, the memory 207 may store data 209 received through the I/O interface 201, the modules 223 and the processor 203. In one embodiment, the data 209 may also include user request data 211, HMI screen data 213, test configuration data 215, image data 217, test data 219 and other data 221.

The user request data 211 may include details of the user request 105 such as details regarding access path information of the TLDB 109 and information associated with the HMI application to be tested on the DUT 115.

The HMI screen data 213 may include screen transition datasets and screen design datasets obtained from the TLDB 109 and VDB 111, respectively. The screen transition dataset may include a plurality of conditions associated with HMI screen transitions. The screen design dataset may include view details of HMI screen images, widget properties information, widget type information, widget trigger information and widget status information.

The test configuration data 215 may include the plurality of test configurations generated for HMI testing of the DUT 115.

The image data 217 may include reference images and real time screen images.

The test data 219 may include automation test report 117 generated for the DUT 115.

The other data 221 may store data, including temporary data and temporary files, generated by the modules 223 for performing the various functions of the auto script generation system 101.

In some embodiments, the data 209 stored in the memory 207 may be processed by the modules 223 of the auto script generation system 101. In an example, the modules 223 may be communicatively coupled to the processor 203 configured in the auto script generation system 101. The modules 223 may be present outside the memory 207 as shown in FIG. 2A and implemented as hardware. As used herein, the term modules may refer to an Application Specific Integrated Circuit (ASIC), an electronic circuit, a processor (shared, dedicated, or group) and a memory that execute one or more software or firmware programs, a combinational logic circuit, and/or other suitable components that provide the described functionality.

In some embodiments, the modules 223 may include, for example, a receiving module 225, a test configuration generation module 227, a components identification module 229, a reference creation module 231, a test execution module 233, a report generation module 235 and other modules 237. The other modules 237 may be used to perform various miscellaneous functionalities of the auto script generation system 101. The other modules 237 may include an HMI component identification module, a destination HMI screen determination module, a test path identification module, a HMI component tree generation module, an obtaining module, a hierarchical relationship identification module, a resource determination module, a simulation module, a configuration module, and a matching module. The configuration module may analyse a configuration spreadsheet and provide inputs to the test execution module 233 for executing the HMI screen flow as per the configuration. The configuration module may state a status of the DUT 115. It will be appreciated that aforementioned modules 223 may be represented as a single module or a combination of different modules. Furthermore, a person of ordinary skill in the art will appreciate that in an implementation, the one or more modules 223 may be stored in the memory 207, without limiting the scope of the disclosure. The said modules 223 when configured with the functionality defined in the present disclosure will result in a novel hardware.

In an embodiment, the receiving module 225 may receive the user request 105 from the user 103 for initiating HMI testing through the I/O interface 201. The user request 105 may comprise details regarding access path information of the TLDB 109 and information associated with the HMI application to be tested on the DUT 115. The receiving module 225 may store the information contained in the received user request 105 in the memory 207 as the user request data 211.

In an embodiment, the database parser 205 may obtain the screen transition dataset and the screen design dataset via Database Query Interfaces (DQI) upon receiving the user request 105 via the I/O interface 201. The user request 105 may comprise details regarding access path information of the TLDB 109 and information associated with an HMI application to be tested on the DUT 115. Based on information contained in the user request 105, the database parser 205 may read the TLDB 109 to obtain the screen transition dataset from the TLDB 109. The screen transition dataset may comprise the plurality of conditions associated with HMI screen transitions. Further, the database parser 205 may send the screen transition dataset to the test execution module 233 for HMI testing on the DUT 115. Additionally, the database parser 205 may query the VDB 111 to obtain the screen design dataset from the VDB 111. The screen design dataset may comprise the view details of HMI screen images, widget properties information, widget type information, widget trigger information and widget status information. Further, the database parser 205 may send the screen design dataset to the reference creation module 231 for further processing.

In an embodiment, the test configuration generation module 227 may be configured to generate a plurality of test configurations for the Device Under Test (DUT) 115 upon receiving the user request 105 from the user 103 via the I/O interface 201. Based on the information included in the user request 105, the test configuration generation module 227 may directly obtain the screen transition dataset from the TLDB 109 via the I/O interface 201. Further, the test configuration generation module 227 may identify one or more conditions from the plurality of conditions associated with HMI screen transitions based on the user request 105. The test configuration generation module 227 may apply each of the identified one or more conditions to the source HMI screen for determining the respective destination HMI screen. For each of the one or more conditions, the test configuration generation module 227 may generate a test configuration based on the destination HMI screen. Thereafter, the test configuration generation module 227 may combine the generated test configuration for each of the one or more conditions for generating the plurality of test configurations. In an embodiment, the test configuration generation module 227 may store the plurality of test configurations in the memory 207.

In an alternative embodiment, the test configuration generation module 227 may comprise a test configuration generator (not shown in figure), and a test configuration database (not shown in figure). The test configuration generator may generate the plurality of test configurations based on the screen transition dataset obtained from the TLDB 109. The test configuration generator may determine system's exhaustive manifest conditions based on logical flow data of the HMI to create validation configuration map. From the TLDB 109, the test configuration generator may retrieve specific conditions for which transition logic flow is available in the TLDB 109. The test configuration generator may also determine a set of dynamic data/properties based on which the conditional screen transition flow is performed. The test configuration generator may create a map for the user 103 such as an HMI tester or a developer to select and/or update a test bench setup or test environment for validating the HMI screens. Further, the test configuration generator may store the information in the test configuration database. In an embodiment, the test configuration database may store information in a structured manner by following predefined rules. As an example, the test configuration database may store the information in a table, as shown in FIG. 2B. The table may include a plurality of applications available in an HMI software. The table may have two fields such as, name of applications and test configuration status of respective applications. As an example, based on version, model year, vehicle brand or country, the test configuration status of applications may be either in "Available" state or in "Not Available (NA)" state, as illustrated in FIG. 2B. The applications with test configuration status in the "Available" state may be either included or excluded from the HM testing by selecting "YES" or "NO" flag under the application test configuration status, respectively. The applications with test configuration status marked as "YES" may be automatically tested. As an example, the test configuration database may maintain separate tables for each of the applications. The individual application table may comprise an entry for each conditional transition for the application. As an example, each entry may comprise a "Conditional Function Id" updated from the TLDB 109, "Feature Details", "Feature Test Configuration Status", "Linked Feature Id", "Sub Feature Details" and "Sub Feature Test Configuration Status".

In an embodiment, the components identification module 229 may identify one or more HMI components located in the test path for each transition from the source HMI screen to the destination HMI screen based on at least one test configuration selected from the plurality of test configurations and the screen transition dataset. Here, the components identification module 229 may receive the plurality of test configurations from the test configuration generation module 227, or memory 207. Thereafter, the components identification module 229 may identify the test path by analyzing the plurality of test configurations. For each transition from the source HMI screen to the destination HMI screen, the components identification module 229 may identify the one or more HMI components located in the test path. The one or more HMI components may comprise one or more widgets. Each of the one or more widgets may trigger the transition from the source HMI screen to the destination HMI screen upon receiving a user input on each of the one or more widgets. Further, the components identification module 229 may generate an HMI component tree based on the identified one or more HMI components.

In an embodiment, the reference creation module 231 may determine a reference image for each destination HMI screen from the screen design dataset based on the identified one or more HMI components in the test path. The reference creation module 231 may receive the generated HMI component tree from the components identification module 229. Based on the HMI component tree, the reference creation module 231 may obtain one or more HMI components associated with the destination HMI screen from the VDB 111. Further, the reference creation module 231 may determine information of a parent widget for each of the one or more HMI components associated with the destination HMI screen. Based on the information of the parent widget, the reference creation module 231 may identify one or more hierarchical relationships between the obtained one or more HMI components associated with the destination HMI screen. Further, the reference creation module 231 may determine resources assigned to each of the one or more HMI components associated with the destination HMI screen. Thereafter, the reference creation module 231 may merge the determined resources with the respective obtained one or more HMI components based on the one or more hierarchical relationships to determine the reference image for the destination HMI screen. As an example, the reference creation module 231 may superimpose texts or icons with a background image obtained from the VDB 111 and may generate the reference image of the destination HMI screen. The reference creation module 231 may perform layering of one or more HMI components based on co-ordinates and span such as height and width of the HMI components. Exact font family, size and color may be maintained utilizing the screen design dataset obtained from the database parser 205. As an example, the reference creation module 231 may determine a reference image for a destination HMI screen which include a list of songs.

Figure 2C:
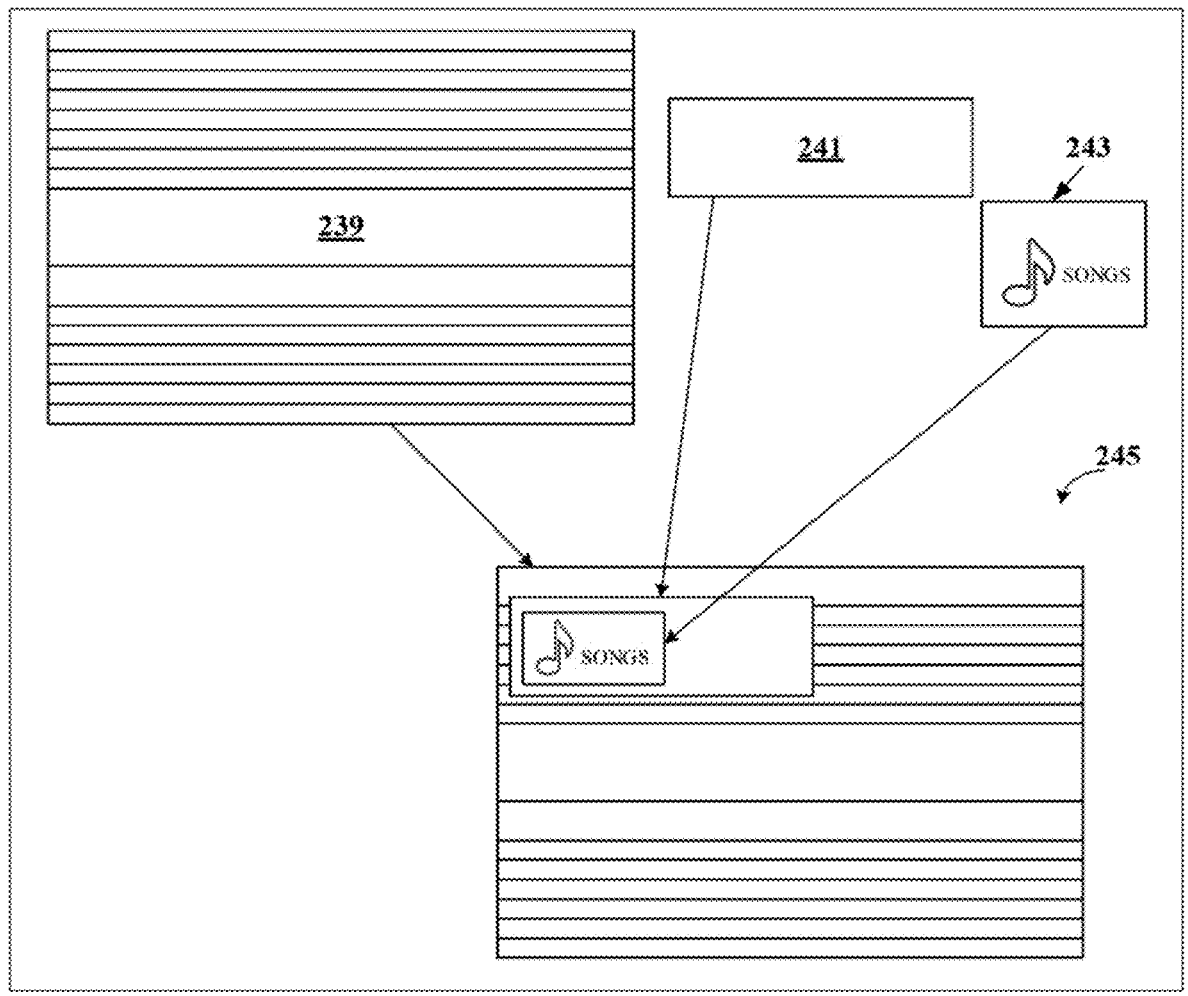

FIG. 2C. As shown, three levels of layering may be performed for the destination HMI screen. A first image 239 "bg_image.png" may represent a first layer in the layering structure, which may form a background view for the destination HMI screen. A second image 241 "menu_container.png" may represent a second layer of the layering structure. The second image 241 may be a small rectangular picture box, which may be superimposed on top of the first image 239. A third image 243, which is a picture box, may represent a third layer of the layering structure. The third image 243 may include both a songs icon image "song_icon.png" and text "Songs", which may be superimposed on top of the second image 241 to obtain an intermediate image 245 of the destination HMI screen, as illustrated in FIG. 2C.

Figure 2D:
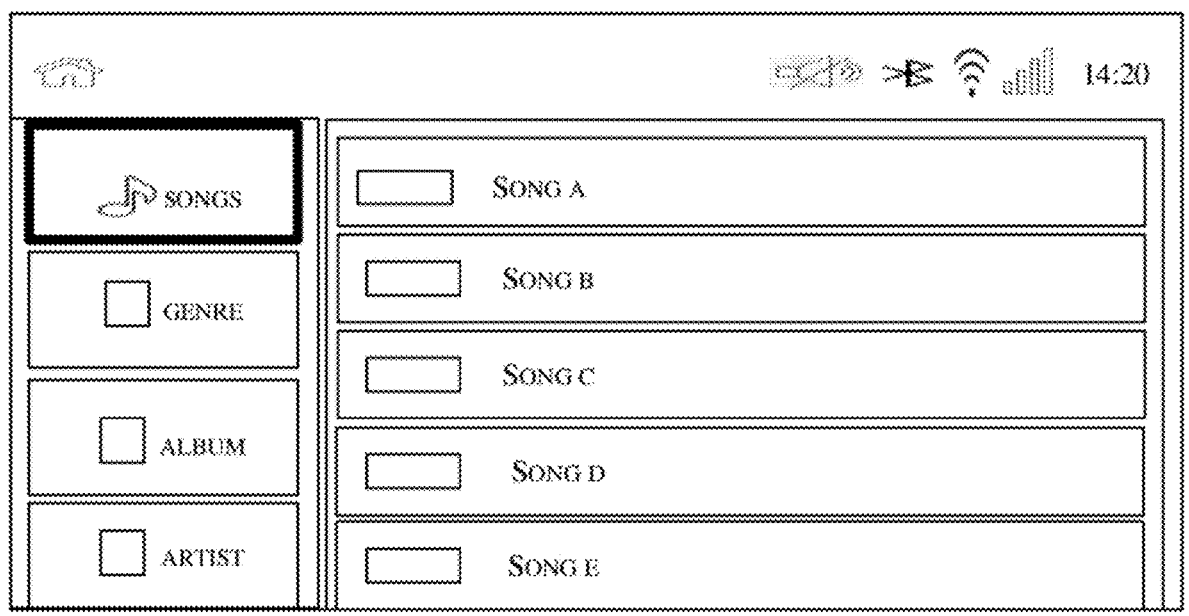

FIG. 2D shows an overall final image 247 representing the destination HMI screen. The overall final image 247 may be formed by performing multiple levels of layering for each of the icons such as, genre, album, artist as shown in FIG. 2D. The layering for these icons may be performed in a similar manner as illustrated in FIG. 2C. In addition to this, a home icon image, and a back button image may be superimposed on the first image 239 to obtain the overall final image 247.

FIG. 2E shows performing layering according to hierarchical relationships between the HMI components based on parent widget information of the HMI components. As an example, the HMI component hierarchy may be depicted in standardized format. The ID of "bg_image.png," "menu_container.png," "song_icon.png" and text "Songs" may be 1C00177, 3C00177, 7C00177 and 8C00177, respectively. For each HMI component, parent PartId and Parent Widget Type columns may be utilized to determine hierarchical relationships between the HMI components for performing the layering in the hierarchical structure.

In an embodiment, the test execution module 233 may execute the at least one test configuration on the DUT 115 via the external simulating device 113 and validates each transition associated with the test path based on matching a real time destination HMI screen image with the reference image. For executing the test configuration on the DUT 115, the test execution module 233 may be invoked by the database parser 205. The test execution module 233 may receive the plurality of test configurations and test inputs. The test execution module 233 may generate the real time source HMI screen on the DUT 115 via the external simulating device 113. The test execution module 233 may simulate a test input for each HMI component of the real time source HMI screen via the external simulating device 113. The test execution module 233 may simulate the test input on the DUT 115 via the external simulating device 113, for triggering a screen transition from the real time source HMI screen to a corresponding real time destination HMI screen on the DUT 115. Thus, based on the simulated test input, the test execution module 233 may generate the real time destination HMI screen image for each screen transition on the DUT 115 via the external simulating device 113. Here, the real time destination HMI screen image for each screen transition on the DUT 115 may be received by the test execution module 233 through the I/O interface 201.

As an example, the test execution module 233 may determine a state for the real time source HMI screen from a screen versus state Extensible Markup Language (xml) file, using the database parser 205. The test execution module 233 may search for state transitions available in a merged xml file. For each transition, the test execution module 233 may check for an associated action id. Then the test execution module 233 may search the action id in the screen xml and may identify the widget with which the action id is associated with. In case the associated widget is found, the test execution module 233 may identify a x-coordinate, a y-coordinate, a height, and a width for the widget from a screen xml and may calculate the centre coordinates. The test execution module 233 may simulate a touch input on the coordinates using the external simulating device 113. Then, the test execution module 233 may wait for a few seconds and may capture a screen shot of a head-unit using the external simulating device 113. In case the associated widget is not found, the test execution module 233 may understand that the transition is a system-initiated transition instead of user initiated. In such condition, the test execution module 233 may check for the "condition function keyword" for that transition. The test execution module 233 may find a mapped function for the keyword and may execute the functions via the external simulating device 113.

Further, the test execution module 233 may validate the real time destination HMI screen image based on matching of one or more HMI components corresponding to each of the real time destination HMI screen image with the one or more HMI components of respective reference image. Transition success may be validated, if the one or more HMI components corresponding to the real time destination HMI screen image match with the one or more HMI components corresponding to the real time destination HMI screen image obtained from the DUT 115. Transition failure may be validated, if at least one of the one or more HMI components corresponding to the real time destination HMI screen image does not match with the one or more HMI components corresponding to the real time destination HMI screen image obtained from the DUT 115. The test execution module 233 may send the validation results to the report generation module 235.

As an example, the external simulating device 113 may check for the destination state of the transition from the merged xml file and may identify the corresponding destination HMI screen from the screen vs state xml file. The test execution module 233 may identify the screen xml from the VDB 111 and may identify the widget with "widget type" as static. For every static widget type, the test execution module 233 may identify the Region of Interest (ROI) using the x-coordinate, the y-coordinate, the height, and the width of the widget. The test execution module 233 may generate a screen id, and a widget id for the ROI. In an embodiment, using image processing, the test execution module 233 may validate the real time destination HMI screen by verifying whether assets are present or not on the given ROI of the captured screenshot. If the asset is present on the ROI, the test execution module 233 may validate transition success, and mark the "test-status" field as passed. If the asset is not present on the ROI, the test execution module 233 may validate transition failure, and may mark the "test-status" field as failed. In this manner, the test execution module 233 may verify all the static assets for the real time destination HMI screen.

In an embodiment, the report generation module 235 may receive the validation results from the test execution module 233. The validation results may be one of transition success or transition failure based on the matching. Based on the validation result, the report generation module 235 may generate the automation test report 117 for the DUT 115. The report generation module 235 may provide the generated automation test report 117 to the user 103 through I/O interface 201. Alternatively, the report generation module 235 may be connected to a display device for displaying the automation test report 117 to the user 103.

Figure 3:
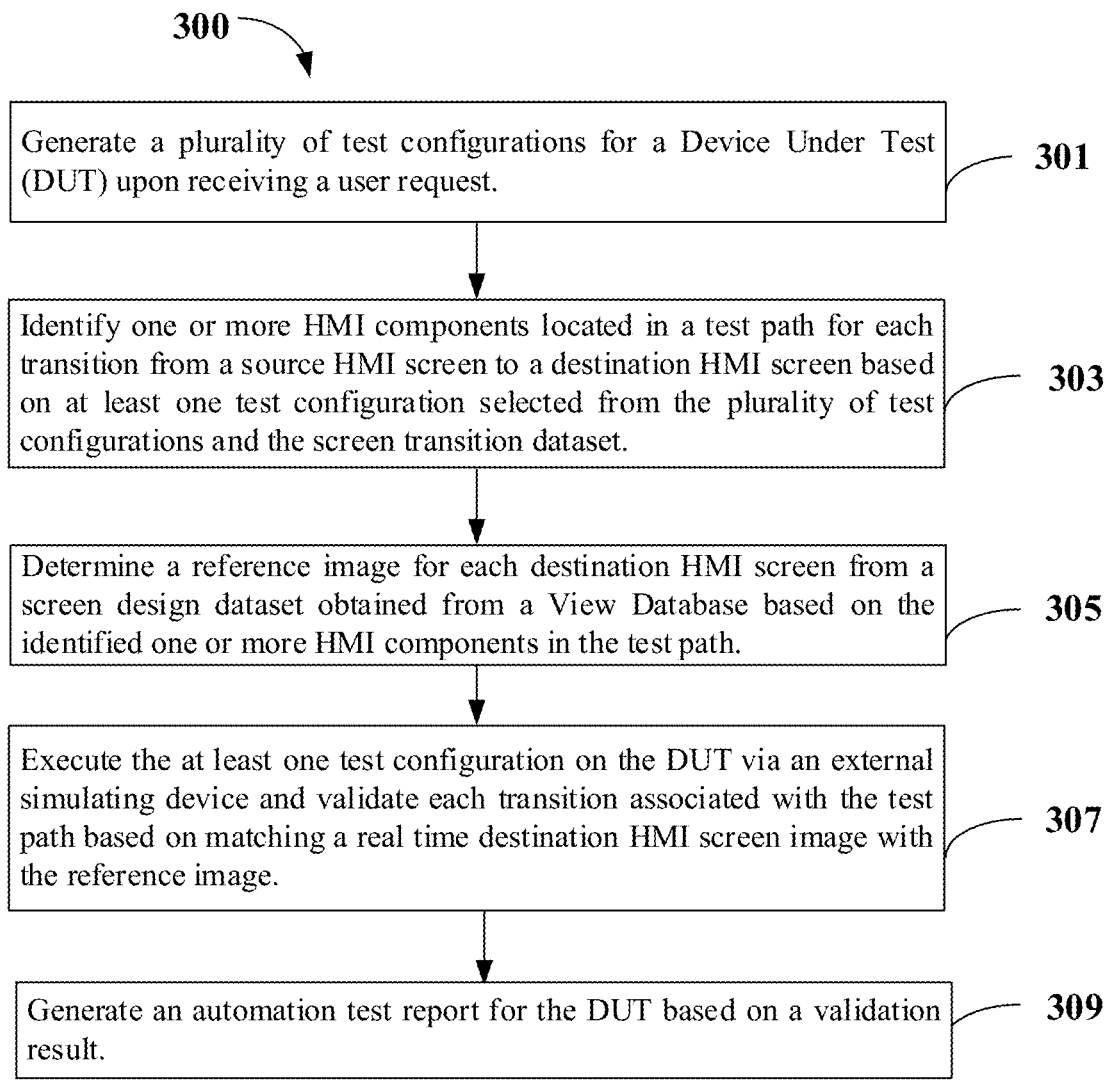
FIG. 3 shows a flow chart illustrating a method of generating automation test scripts dynamically for HMI testing in accordance with some embodiments of the present disclosure.

FIG. 3 shows a flow chart illustrating a method of generating automation test scripts dynamically for HMI testing in accordance with some embodiments of the present disclosure.

As illustrated in FIG. 3, the method 300 includes one or more blocks illustrating a method of generating automation test scripts dynamically for HMI testing. The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, the method may include generating, by the test configuration generation module 227, the plurality of test configurations for the DUT 115 upon receiving the user request 105. The plurality of test configurations may be generated based on the screen transition dataset obtained from the TLDB 109. The screen transition dataset may comprise the plurality of conditions associated with HMI screen transitions. Particularly, one or more conditions may be identified from the plurality of conditions associated with HMI screen transitions based on the user request 105. Here, the user request 105 may comprise details regarding access path information of the TLDB 109 and information associated with an HMI application to be tested on the DUT 115. Further, each of the identified one or more conditions may be applied to the source HMI screen for determining the respective destination HMI screen. Thereafter, the test configuration may be generated based on the destination HMI screen for each of the one or more conditions. Further, the plurality of test configurations may be generated by combining the generated test configuration for each of the one or more conditions.

At block 303, the method may include identifying, by the components identification module 229, one or more HMI components located in the test path for each transition from the source HMI screen to the destination HMI screen based on at least one test configuration selected from the plurality of test configurations and the screen transition dataset. Particularly, the test path may be identified by analyzing the plurality of test configurations. Further, the one or more HMI components located in the test path may be identified for each transition from the source HMI screen to the destination HMI screen. Based on the identified one or more HMI components, the HMI component tree may be generated. Here, the one or more HMI components may comprise one or more widgets. Each of the one or more widgets may trigger the transition from the source HMI screen to the destination HMI screen upon receiving the user input on each of the one or more widgets.

At block 305, the method may include determining, by the reference creation module 231, a reference image for each destination HMI screen from the screen design dataset based on the identified one or more HMI components in the test path. The screen design dataset may be obtained from the VDB 111. The screen design dataset may comprise view details of HMI screen images, widget properties information, widget type information, widget trigger information and widget status information. Particularly, one or more HMI components associated with the destination HMI screen may be obtained from the VDB 111 based on the HMI component tree. Further, one or more hierarchical relationships may be identified between the obtained one or more HMI components associated with the destination HMI screen by determining information of a parent widget for each of the one or more HMI components. Thereafter, resources assigned to each of the one or more HMI components associated with the destination HMI screen may be determined. Further, the reference image for the destination HMI screen may be determined by merging the determined resources with the respective obtained one or more HMI components based on the one or more hierarchical relationships.

At block 307, the method may include executing, by the test execution module 233, the at least one test configuration on the DUT 115 via the external simulating device 113 and validating each transition associated with the test path based on matching a real time destination HMI screen image with the reference image. Particularly, the real time source HMI screen may be generated on the DUT 115 via the external simulating device 113. Further, a test input for each HMI component of the real time source HMI screen may be simulated via the external simulating device 113, for triggering a screen transition to corresponding real time destination HMI screen on the DUT 115. Further, the real time destination HMI screen image may be generated for each screen transition on the DUT 115 based on the simulated test input via the external simulating device 113. The real time destination HMI screen image for each screen transition on the DUT 115 may be transmitted to the test execution module 233. Further, one or more HMI components corresponding to each of the real time destination HMI screen image may be matched with the one or more HMI components of respective reference image. Based on the matching, success or failure of the transition associated with the test path may be validated.

At block 309, the method may include generating, by the report generation module 235, the automation test report 117 for the DUT 115 based on the validation result. The validation result may be one of transition success or transition failure.

Figure 4:
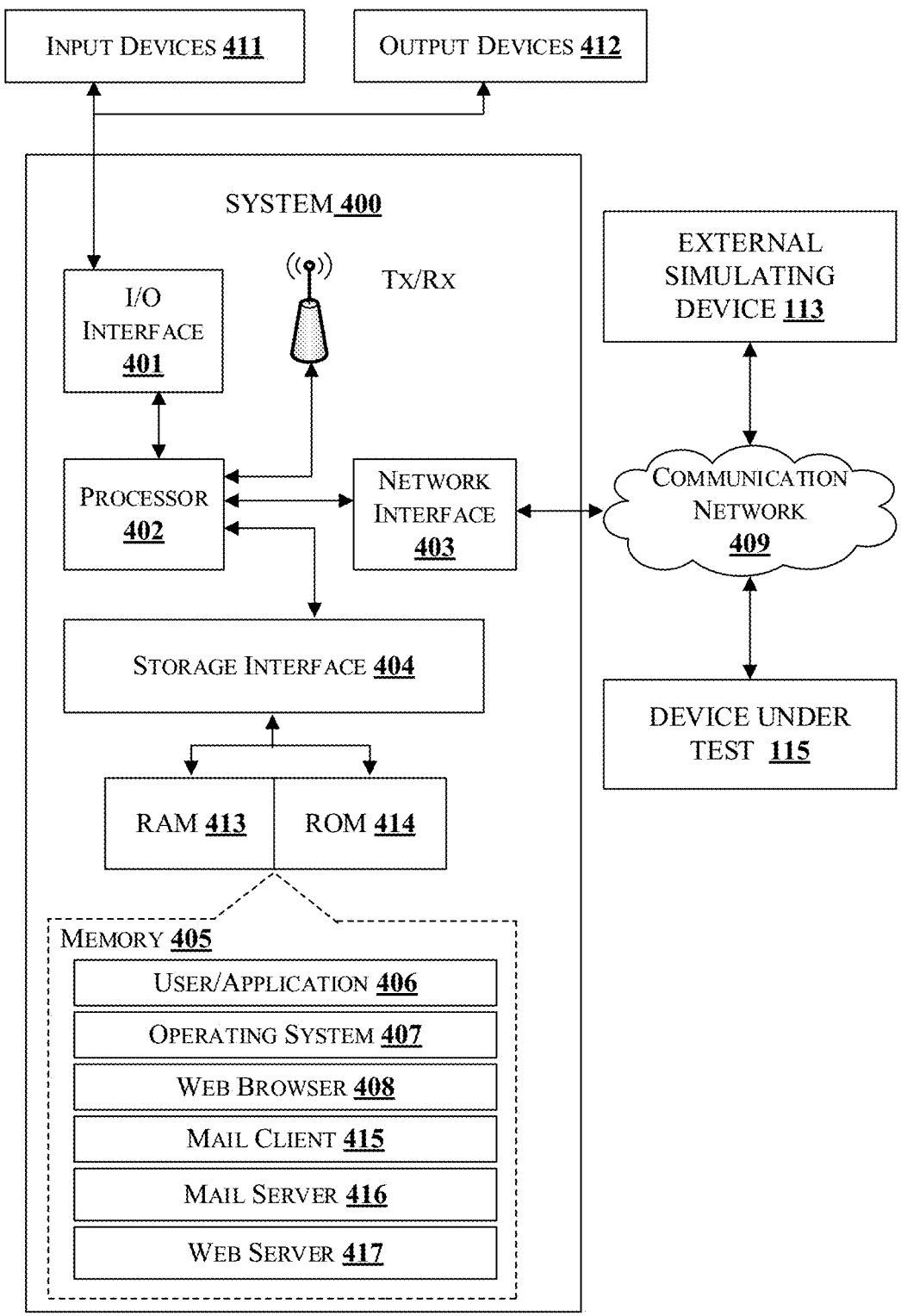
FIG. 4 shows a block diagram of an exemplary computer system for implementing embodiments consistent with the present disclosure.

FIG. 4 shows a block diagram of an exemplary computer system for implementing embodiments consistent with the present disclosure.

FIG. 4 illustrates a block diagram of an exemplary computer system 400 for implementing embodiments consistent with the present disclosure. In an embodiment, the computer system 400 is used to implement the auto script generation system 101 for generating automation test scripts dynamically for Human Machine Interface (HMI) testing. The computer system 400 may include a central processing unit ("CPU" or "processor") 402. The processor 402 may comprise at least one data processor for executing program components for executing user or system-generated business processes. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 401, the computer system 400 may communicate with one or more I/O devices 411 and 412.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc.

The communication network 409 can be implemented as one of the several types of networks, such as intranet or Local Area Network (LAN) and such within the organization. The communication network 409 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc.

In some embodiments, the processor 402 may be disposed in communication with a memory 405 (e.g., RAM 413, ROM 414, etc. as shown in FIG. 4 via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user/application 406, an operating system 407, a web browser 408, mail client 415, mail server 416, web server 417 and the like. In some embodiments, computer system 400 may store user/application data, such as the data, variables, records, etc. as described in this invention. Such databases may be implemented as fault-tolerant, relational, scalable, secure databases such as Oracle® or Sybase®.

The operating system 407 may facilitate resource management and operation of the computer system 400. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like. A user interface may facilitate display, execution, interaction, manipulation, or operation of program components through textual or graphical facilities. For example, user interfaces may provide computer interaction interface elements on a display system operatively connected to the computer system 400, such as cursors, icons, check boxes, menus, windows, widgets, etc. Graphical User Interfaces (GUIs) may be employed, including, without limitation, APPLE MACINTOSH® operating systems, IBM™ OS/2, MICROSOFT™ WINDOWS™ (XP™ VISTA™/7/8, 10 etc.), Unix® X-Windows, web interface libraries (e.g., AJAX™, DHTML™, ADOBE® FLASH™ JAVASCRIPT™, JAVA™, etc.), or the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

In an embodiment, the present disclosure provides an auto script generation system and a method for generating automation test scripts dynamically for HMI testing.

In an embodiment, the present disclosure provides a method to automatically performs testing of the HMI application on the DUT with minimal manual intervention. Further, probability of introducing errors in the test configurations is significantly reduced due to automation process.

The disclosed system and method overcome technical problem of performing HMI testing by developing test scripts without manual intervention and validating HMI components of the destination HMI screen associated with screen transitions in the HMI application against the requirements. Particularly, reference images of destination HMI screens are directly determined from HMI specifications utilizing the TLDB 109 and VDB 111, instead of capturing HMI screen shots from a target device manually for utilizing as reference image. Further, the reference images are utilized for screen verifications on the DUT for the automation cycles. As a result, the present disclosure provides a reliable HMI testing platform, as the HMI screens are verified against the requirement screen image, thereby properly detecting mismatch errors associated with HMI screen design and corresponding functionalities. This also reduces time requirement to market the HMI product even with dynamically changing HMI requirements and enables effectively performing HMI testing on the DUTs, thereby improving quality of the HMI product.

Currently HMI screens are verified against developed screen image. In such scenarios, errors associated with dimension and properties of the HMI components present in the developed screen image may remain undetected, which results in erroneous test report and introduces significant delay in timely delivery of the HMI product. Further, separate test-scripts are generated for validating each HMI screen transition during HMI testing procedure, which is time consuming.

In light of the above-mentioned advantages and the technical advancements provided by the disclosed system and method, the claimed steps as discussed above are not routine, conventional, or well understood in the art, as the claimed steps enable the following solutions to the existing problems in conventional technologies. Further, the claimed steps clearly bring an improvement in the functioning of the system itself as the claimed steps provide a technical solution to a technical problem.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise. The enumerated listing of items does not imply that any or all the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | Auto script generation system |
| 103 | User |
| 105 | User request |
| 107 | Database server |
| 109 | Transition Logic Database (TLDB) |
| 111 | View Database (VDB) |
| 113 | External simulating device |
| 115 | Device Under Test (DUT) |
| 117 | Automation test report |

-continued

| Reference Number | Description |
| --- | --- |
| 201 | I/O interface |
| 203 | Processor |
| 205 | Database parser |
| 207 | Memory |
| 209 | Data |
| 211 | User request data |
| 213 | HMI screen data |
| 215 | Test configuration data |
| 217 | Image data |
| 219 | Test data |
| 221 | Other data |
| 223 | Modules |
| 225 | Receiving module |
| 227 | Test configuration generation module |
| 229 | Components identification module |
| 231 | Reference creation module |
| 233 | Test execution module |
| 235 | Report generation module |
| 237 | Other modules |
| 239 | First image |
| 241 | Second image |
| 243 | Third image |
| 245 | Intermediate image |
| 247 | Overall final image |
| 400 | System |
| 401 | I/O Interface |
| 402 | Processor |
| 403 | Network interface |
| 404 | Storage interface |
| 405 | Memory |
| 406 | User/Application |
| 407 | Operating system |
| 408 | Web browser |
| 409 | Communication network |
| 411 | Input device |
| 412 | Output device |
| 413 | RAM |
| 414 | ROM |
| 415 | Mail client |
| 416 | Mail server |
| 417 | Web server |

What is claimed is:

1. A processor implemented method for Human Machine Interface (HMI) testing on a Device Under Test (DUT), the method comprising executing processor-executable instructions causing a processor of a system to:
generate a plurality of test configurations for the DUT upon receiving a user request, wherein the plurality of test configurations is generated based on a screen transition dataset obtained from a Transition Logic Database (TLDB), and wherein the screen transition dataset comprises a plurality of conditions associated with HMI screen transitions;
identify one or more HMI components located in a test path for each transition from a source HMI screen to a destination HMI screen based on at least one test configuration selected from the plurality of test configurations and the screen transition dataset;
determine a reference image for each destination HMI screen from a screen design dataset obtained from a View Database (VDB) based on the identified one or more HMI components in the test path by:
obtaining a plurality of HMI components associated with the destination HMI screen from the VDB based on the HMI component tree,
identifying one or more hierarchical relationships between the plurality of HMI components associated with the destination HMI screen by determining information of a parent widget for each of the plurality of HMI components,
determining resources assigned to each of the plurality of HMI components associated with the destination HMI screen, and
determining the reference image for the destination HMI screen by merging the determined resources with the respective plurality of HMI components based on the one or more hierarchical relationships;
execute the at least one test configuration on the DUT via an external simulating device and validating each transition associated with the test path based on matching a real time destination HMI screen image with the reference image; and
generate an automation test report for the DUT based on a validation result.

2. The processor implemented method as claimed in claim 1, wherein generating the plurality of test configurations comprises:
identifying one or more conditions from a plurality of conditions based on the user request;
applying each of the identified one or more conditions to the source HMI screen for determining the respective destination HMI screen;
generating the test configuration based on the destination HMI screen for each of the one or more conditions; and
generating the plurality of test configurations by combining the generated test configuration for each of the one or more conditions.

3. The processor implemented method as claimed in claim 1, wherein identifying the one or more HMI components located in the test path comprises:
identifying the test path by analyzing the plurality of test configurations;
identifying the one or more HMI components located in the test path for each transition from a source HMI screen to a destination HMI screen; and
generating an HMI component tree based on the identified one or more HMI components.

4. The processor implemented method as claimed in claim 1, wherein executing the at least one test configuration on the DUT by the processor of the system comprises:
generating, a real time source HMI screen on the DUT;
simulating, a test input for each HMI component of the real time source HMI screen for triggering a screen transition to a corresponding real time destination HMI screen on the DUT;
generating, the real time destination HMI screen image for each screen transition on the DUT based on the simulated test input, wherein the real time destination HMI screen image for each screen transition on the DUT is transmitted to the system; and
validating each respective real time destination HMI screen image based on matching one or more HMI components corresponding to each respective real time destination HMI screen image with one or more HMI components of each respective reference image.

5. A non-transitory computer readable medium including processor-executable instructions stored thereon that when processed by at least one processor cause a system for Human Machine Interface (HMI) testing on a Device Under Test (DUT) to perform a method, the method comprising:
generating a plurality of test configurations for the DUT upon receiving a user request, wherein the plurality of test configurations is generated based on a screen transition dataset obtained from a Transition Logic Database (TLDB), wherein the screen transition dataset comprises a plurality of conditions associated with HMI screen transitions;

identifying one or more HMI components located in a test path for each transition from a source HMI screen to a destination HMI screen based on at least one test configuration selected from the plurality of test configurations and the screen transition dataset;

determining a reference image for each destination HMI screen from a screen design dataset obtained from a View Database (VDB) based on the identified one or more HMI components in the test path by:

obtaining a plurality of HMI components associated with the destination HMI screen from the VDB based on the HMI component tree, identifying one or more hierarchical relationships between the plurality of HMI components associated with the destination HMI screen by determining information of a parent widget for each of the plurality of HMI components, determining resources assigned to each of the plurality of HMI components associated with the destination HMI screen, and determining the reference image for the destination HMI screen by merging the determined resources with the respective plurality of HMI components based on the one or more hierarchical relationships;

executing the at least one test configuration on the DUT via an external simulating device and validate each transition associated with the test path based on matching a real time destination HMI screen image with the reference image; and generating an automation test report for the DUT based on a validation result.

6. A system for Human Machine Interface (HMI) testing on a Device Under Test (DUT), the system comprising:

a processor; and a memory communicatively coupled to the processor, wherein the memory stores the processor-executable instructions, which, on execution, causes the processor to:

receive a user request for initiating the HMI testing;

generate a plurality of test configurations for the DUT upon receiving the user request, wherein the plurality of test configurations is generated based on a screen transition dataset obtained from a Transition Logic Database (TLDB), wherein the screen transition dataset comprises a plurality of conditions associated with HMI screen transitions;

identify one or more HMI components located in a test path for each transition from a source HMI screen to a destination HMI screen based on at least one test configuration selected from the plurality of test configurations and the screen transition dataset;

determine a reference image for each destination HMI screen from a screen design dataset obtained from a View Database (VDB) based on the identified one or more HMI components in the test path by:

obtaining a plurality of HMI components associated with the destination HMI screen from the VDB based on the HMI component tree, identifying one or more hierarchical relationships between the plurality of HMI components associated with the destination HMI screen by determining information of a parent widget for each of the plurality of HMI components, determining resources assigned to each of the plurality of HMI components associated with the destination HMI screen, and determining the reference image for the destination HMI screen by merging the determined resources with the respective plurality of HMI components based on the identified one or more hierarchical relationships;

execute the at least one test configuration on the DUT via an external simulating device and validate each transition associated with the test path based on matching a real time destination HMI screen image with the reference image; and generate an automation test report for the DUT based on a validation result.

7. The system as claimed in claim 6, wherein the user request comprises details regarding access path information of the TLDB and information associated with an HMI application to be tested on the DUT.

8. The system as claimed in claim 6, wherein the one or more HMI components comprise one or more widgets, wherein each of the one or more widgets trigger each transition from the source HMI screen to the destination HMI screen upon receiving a user input on each of the one or more widgets.

9. The system as claimed in claim 6, wherein the processor-executable instructions for generating the plurality of test configurations, on execution cause the processor to:

identify one or more conditions from a plurality of conditions based on the user request;

apply each of the identified one or more conditions to the source HMI screen for determining the respective destination HMI screen;

generate the test configuration based on the destination HMI screen for each of the one or more conditions; and generate the plurality of test configurations by combining the generated test configuration for each of the one or more conditions.

10. The system as claimed in claim 6, wherein the processor-executable instructions for identifying the one or more HMI components located in the test path, on execution cause the processor to:

identify the test path by analyzing the plurality of test configurations;

identify the one or more HMI components located in the test path for each transition from a source HMI screen to a destination HMI screen; and generate an HMI component tree based on the identified one or more HMI components.

11. The system as claimed in claim 6, wherein processor-executable instructions for executing the at least one test configuration on the DUT causes the processor to:

generate a real time source HMI screen on the DUT;

simulate a test input for each HMI component of the real time source HMI screen for triggering a screen transition to a corresponding real time destination HMI screen on the DUT;

generate the real time destination HMI screen image for each screen transition on the DUT based on the simulated test input, wherein the real time destination HMI screen image for each screen transition on the DUT is transmitted to the system; and validate each respective real time destination HMI screen image based on matching one or more HMI components corresponding to each respective real time destination HMI screen image with one or more HMI components of each respective reference image.

* * * * *